June 8, 1943.  B. J. YANCHENKO  2,321,171
TWO HAND CONTROL
Filed Jan. 19, 1942  2 Sheets-Sheet 1
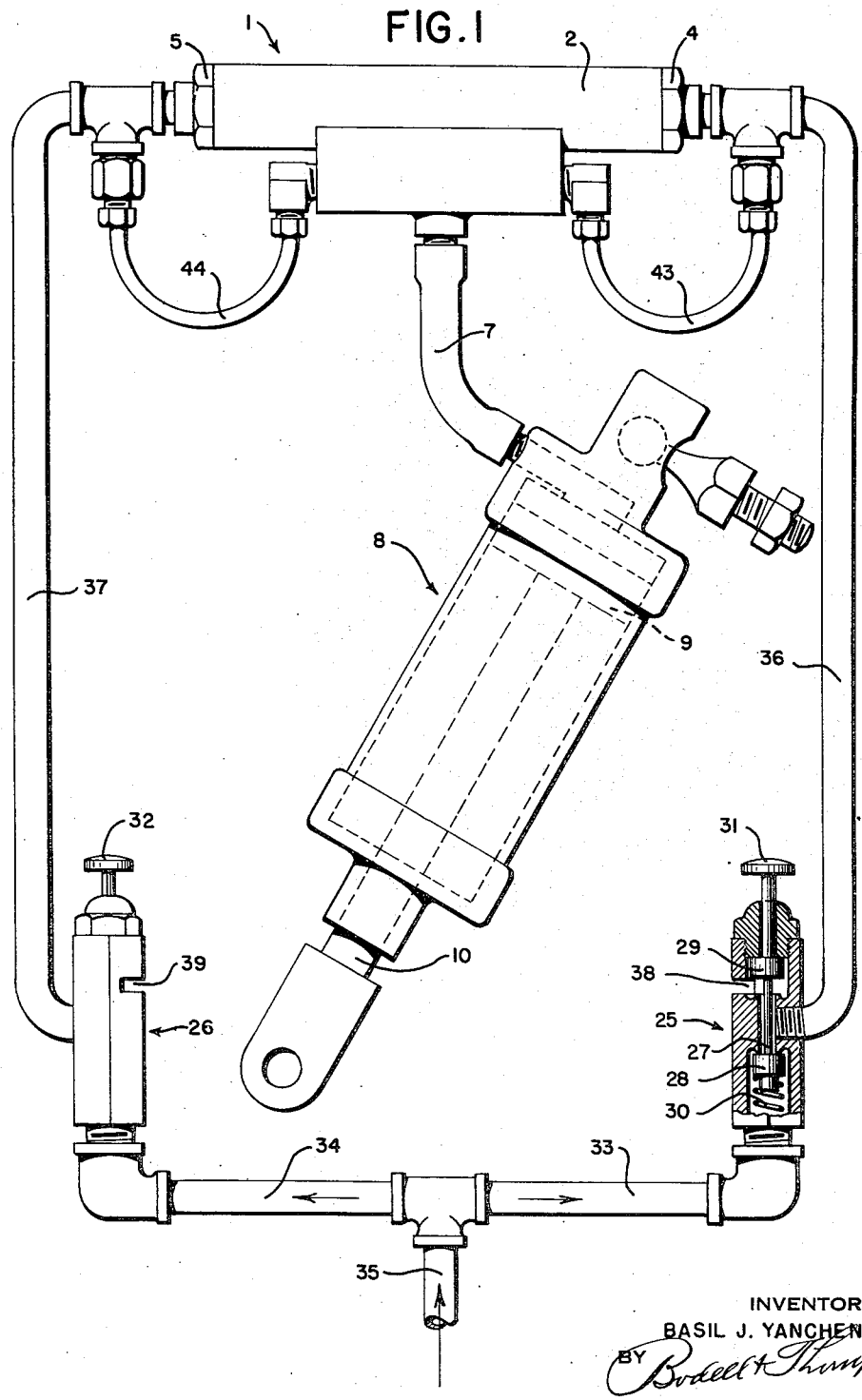
INVENTOR
BASIL J. YANCHENKO
ATTORNEYS

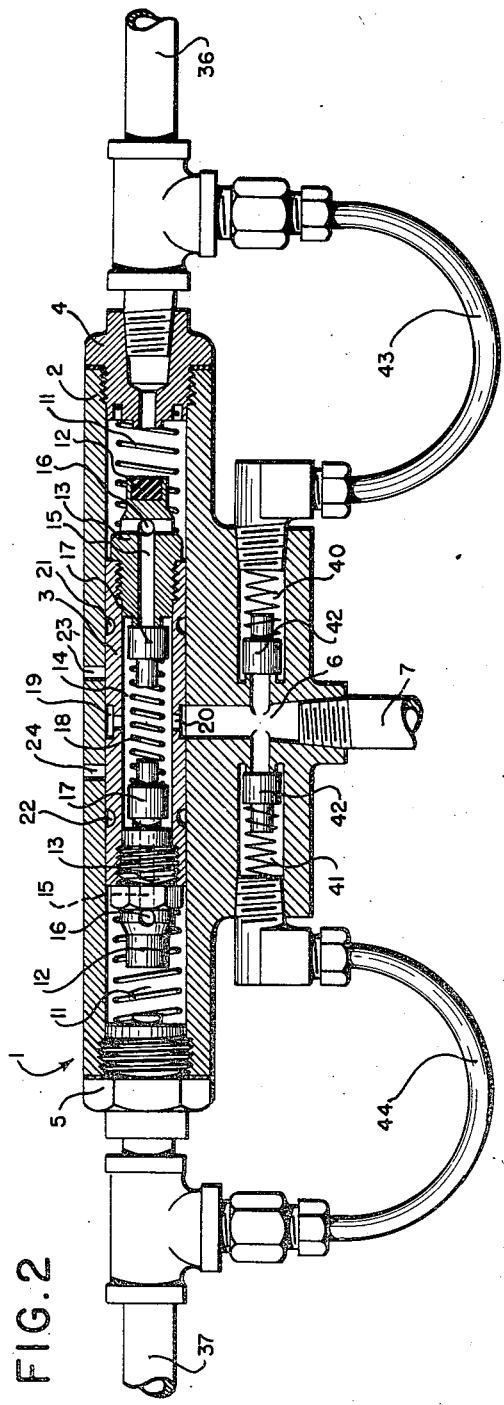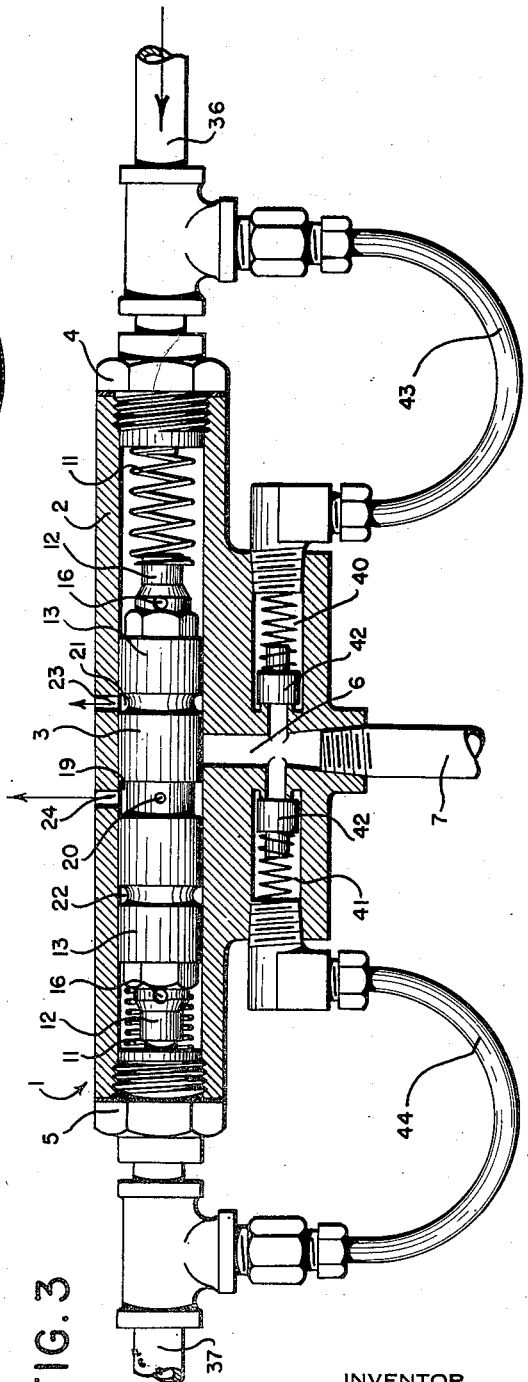

Patented June 8, 1943

2,321,171

UNITED STATES PATENT OFFICE 2,321,171

TWO-HAND CONTROL

Basil J. Yanchenko, Syracuse, N. Y., assignor to The Prosperity Company, Inc., Syracuse, N. Y., a corporation of New York Application January 19, 1942, Serial No. 427,356

5 Claims. (Cl. 192—131)

This invention relates to two hand controls for controlling the actuation of a machine or an apparatus, the operation of which is dangerous to the operator, and has for its object a two hand control requiring the operation of two manuals, particularly in unison, and holding them operated at least during the dangerous part of the operating movement of the machine.

It further has for its object a pressure fluid operated, as a pneumatically operated, two hand control for controlling the flow of motive fluid to an operating part of a machine, embodying a simple and economical means, whereby the actuating mechanism of the machine is immediately disabled in the event one manual is released before the machine completes the dangerous portion of its operating movement, and also whereby the machine is automatically inoperative in case one of the manuals is tied or fastened down, or whereby a machine cannot be operated unless both manuals are operated in unison.

It further has for its object the arrangement and features of constructions hereinafter pointed out.

The invention here illustrated is adapted for machines, as punch presses, wherein a head makes a complete reciprocation, that is, a down and up stroke, upon each operation, and the object is to prevent repeated operations, unless both manuals are operated by the operator in unison for each operation.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view illustrating the general arrangement of this two hand control.

Figure 2 is a longitudinal sectional view through the master valve, contiguous parts of the control system being also shown and the valve member or plunger being shown in its normal or balanced position.

Figure 3 is a view similar to Figure 2 showing the position of the valve member or plunger when in an unbalanced position, or when in one of the positions it assumes when one manual is operated in advance of the other, or when one manual is tied down.

The invention is here illustrated as controlling the flow of motive fluid, as compressed air, to a fluid operated motor forming part of the machine, and hence this control includes valves, as the power to be controlled is a pressure fluid.

This two hand control includes a master valve provided with a pair of inlets for a pressure fluid, as compressed air, an outlet to the motor to be served with pressure fluid, which motor is part of the actuating mechanism or control for the actuating mechanism of a machine, as for instance, a punch press, a movable valve member in the casing normally located, so that both the inlets and the outlet are open, the movable member of the master valve being operable to close either inlet and the outlet, by the pressure of the fluid entering the master valve through the other inlet only, and self-returning manual valves for controlling the flow of fluid to the inlets respectively, the master valve member being held from shifting or being balanced in normal position when both manual valves are operated in unison and the pressure on opposite sides of the movable member of the master valve is equal. It further includes exhaust valves communicating with the outlet, one for each manual valve, the exhaust valves being held closed by the fluid pressure passing through the manual valves when the latter are operated and being open to exhaust the air from the outlet, and the motor being served, by the greater pressure in the outlet than the pressure controlled by the manual valves when either manual valve is released.

More specifically, the two hand control here illustrated includes a master valve having a movable, normally-balanced valve member and opposing inlets for a motive fluid, and an outlet, the valve member being normally balanced between the inlets, and when in this position, both inlets are open and also the outlet leading to the pressure operated motor of the machine to be operated is also open, this valve member being shiftable to close the outlet and either inlet when fluid is supplied to the other inlet only, and individually operable manual valves controlling the flow of fluid to the inlet. The two hand control further includes check valve controlled passages connected to the conduits leading to the inlets and controlled by the manual valves and communicating with the outlet, the check valves being arranged to prevent fluid pressure flowing past the same into the outlet, but permitting the exhaust of fluid from the outlet whenever the pressure in the outlet is greater than the pressure behind the check valve, as when one of the manual valves is released after both manuals have been operated, and the machine has started on its operating movement. The master valve here shown is of the sliding valve or plunger type.

1 designates, generally, the master valve. This includes a tubular casing 2 having a movable valve member, as a sliding plunger 3 therein, the casing 2 being provided with inlet ports at its opposite ends, these being shown as provided in removable heads 4, 5 at the ends of the casing 2. The heads are here shown as plugs threading in opposite ends of the casing 2. The casing is also formed with an outlet port 6 which communicates through pipe 7 with a pressure operated motor, it being here shown as connected to one end of the cylinder 8 having a piston 9 therein, the rod 10 of which is connected to any suitable part of the machine to be operated. The movable member or plunger 3 is normally balanced in an intermediate position with its opposite ends spaced from the inlet ports in the heads 4, 5, so that said ports are open and when in this balanced position, the outlet 6 is also open. The plunger is located in its intermediate or balanced position by suitable springs 11 therein interposed between the heads 4, 5 and the opposing ends of the plunger 3. The plunger is provided with valve heads 12 at its opposite ends which are movable into position to close one or the other of the ports in the heads 4, 5 when the plunger is moved out of its balanced position. The plunger 3 is here shown as tubular or hollow and as having heads or plugs 13 at its opposite ends forming a chamber 14 within the plunger, the heads being formed with axial or lengthwise passages 15 therethrough which open at their outer ends through radial passages 16 into the ends of the valve casing 2, these ports being located at the bases of the valve heads 12, 13. The ports 15 are normally closed by valve heads 17 pressed against the inner ends of the ports by a spring 18 common to both valve heads. The plunger or slide 3 is provided with a circumferential or peripheral passage 19 which communicates with the internal chamber 14 of the plunger through radial ports 20, the peripheral passage 19 normally registering with the outlet 6 when the plunger or slide is in its intermediate balanced position and moving out of register therewith to cut off the outlet 6, as seen in Figure 3, when the plunger or slide 3 is moved out of its intermediate or balanced position. The slide or plunger 3 is also provided with additional peripheral or circumferential passages 21, 22 spaced apart in an axial direction on opposite sides of the passage 19, these being located to come into register with release passages 23, 24 in the casing 2 when the plunger or slide is out of balanced position in one direction or the other, as seen in Figure 3. These passages 21, 22 and release openings 23, 24 are for the purpose of trapping and releasing any air pressure that might pass around the plunger from one end to the other, when the plunger is in an unbalanced position. The pressure area of the valve heads 12 is less than the pressure area of the entire end of the plunger and the pressure area of the valve heads 17.

25 and 26 designate respectively right and left manual control valves connected in multiple in a fluid supply system and also connected to the inlets respectively of the master valve. These valves are of the two-way or of the combined intake and exhaust type. Each of the valves 25, 26, as here shown, includes a suitable casing having a movable valve member 27 therein provided with a normally closed intake valve head 28 and a normally open exhaust valve head 29, the valve being pressed to its normal position by a spring 30 and operated by a manual or push button 31, 32 respectively. The intake ends of the valve casings 25, 26 are connected through conduits 33, 34, respectively, to a main supply line 35 and the valve casings 25, 26 are connected by branch conduits 36, 37, to the inlets in the heads 4, 5 of the master valve. The valves 25, 26 are normally open to the outer air through exhaust passages 38, 39.

Upon the operation of both manuals or push buttons 31, 32, in unison, air will pass through both valves 25, 26, both branches 36, 37 into opposite ends of the casing 3 of the master valve, and hence the master valve will remain in balanced position, so that the air will pass through the radial ports 16 in the heads of the plunger 3 through both axial passages 15 in the heads of the plunger and unseat the valves 17, so that the air will pass into the internal chamber 14 of the plunger out through the radial ports 20 into the peripheral passage 19 which is in register with the outlet port 6, then through the outlet port 6 and pipe 7 to the cylinder 8 and actuate the piston therein. When the manuals are released, the air will exhaust back through the pipe 7 to the outer air through the manual valves 25, 26 or the valves that have been released, as will now be described.

The exhaust of air from the cylinder 6, when either or both manual valves are released or returned to normal position, is effected through right and left passages communicating with the outlet port 6 of the master valve, and as here shown, the casing or body 2 of the master valve is formed with passages 40, 41 and spring-pressed check valves 42 therein, these branches being connected by suitable conduits 43, 44 to the branches 36, 37 respectively which are controlled by the valves 25, 26. The check valves are so arranged as to be held against their seats by springs when the pressure is equal in the outlet 6 of the master valve and in the conduits 36, 37 and to be moved individually from their seats when the pressure is greater in the outlet 6 and pipe 7 than in the branches 36, 37, as would be the case when either or both manual valves 25, 26 is released, so that the air can exhaust to either or both exhaust passages 38, 39 of the valves 25, 26.

In the normal operation, upon the simultaneous operation of both manuals 31, 32, air will pass from the feed line 35, through the pipes 33, 34, valves 25, 26, branches 36, 37 and into the inlets and at opposite ends of the master valve casing 2 through the ports 16 and 15 into the central chamber 14 of the plunger 3, thence out through the radial passage 20 and peripheral passage 19 through the outlet port 6 and pipe 7 to the cylinder 8 to actuate the piston therein. The air will also pass from the branches 36, 37 through the pipes 33, 34 and hold the check valves 42 against their seats, preventing the exhaust of air from the cylinder or from the port 6. Assume that the left hand manual 32 is released and the right hand manual 31 still held operated, then the air is free to exhaust from the left end of the master valve casing 2 and also back through the pipe 44, this causing the plunger 3 to move to the unbalanced position shown in Figure 3, and also permits the check valve 42 in the left hand passage 41 to be unseated by the greater pressure in the pipe 7 and port 6, and hence to exhaust back through the port 44 and branch 37, valve 26 to the outer air through the exhaust passage 39 of the valve 26. The same action takes place, if the right hand push button or manual 31 only is released, except that the plunger 3 shifts to the right end of the master valve casing 2 and the check valve in the right passage 31 opens to the exhaust of air through the right hand branch 36 and right hand manual 25. Thus, when either manual valve is released, the cylinder and piston motor 8, 9 is disabled. The same exhaust action takes place through both valves 25, 26 when both manuals are released simultaneously, except that, of course, the plunger 3 remains in its balanced position. When one manual is released, the plunger moves into an unbalanced position, as described, and it returns to balanced position when the other manual is released, it being returned by the balancing springs 11.

An analogous operation or action takes place when an attempt is made to operate the machine by operating one manual ahead of the other or in tying down one manual; as for instance, assume that only the right hand manual 31 is operated, and hence only the valve 25 opened to the flow of air. The air then passes from the feed line 35, pipe 33, through operated valve 25, branch conduit 36, through the inlet port in the right head 4 of the master valve 2, acts on the plunger 3 and shifts it to the left into the position shown in Figure 3, closing the inlet port in the left hand head 5 of the master valve casing 2. In so shifting, the outlet port 6 is cut off or closed by the fact that the circumferential passage 19 moves out of register with the port 6. Also, one of the peripheral passages or grooves 21 is moved into register with the release port 23 to release any air tending to pass around the plunger 3. A similar action takes place, if only the left hand manual 32 is operated, except that the plunger 3 moves to the right end of the master valve casing 2.

If, after one of the manuals, as 31, has only been operated, and the plunger 3 moved toward unbalanced position shown in Figure 3, the operator then operates the left end manual 32, and the plunger will still remain in unbalanced position, as the pressure area of the air through the port in the left end head 5 of the master valve casing 2 is considerably less than the effective pressure area of the plunger at the right end of the plunger subject to the air pressure through the inlet port in the right end head. The additional compression of the spring 11 does not overcome the predominating pressure through the port in the right hand head 4. The action is the same in case the left hand manual 32 is first operated, so that the plunger shifts to the right end of the master valve casing.

What I claim is:

1. A two hand control including a master valve having a movable valve member, opposing inlets for motive fluid, and an outlet, the valve member having heads for closing the inlets respectively and being normally arranged so that the inlets and the outlet are open, and being shiftable to close the outlet and either inlet when fluid is supplied to the other inlet only, a supply line having branches to the inlets respectively, and individually operable manual valves in said branches, the manual valves being of the combined intake and exhaust type and normally arranged so that their intakes are closed and the exhaust open, and conduits connecting the branches between the manual valves and the master valve, and the outlet of the master valve, the conduits having check valves therein operable to exhaust the fluid from the outlet when either of the manual valves is in its normal position.

2. A two hand control including a master valve, a plunger slidable therein, the master valve having inlets for a motive fluid on opposite ends of the plunger, the plunger having heads at its opposite ends normally spaced from the inlets and movable to close said inlets respectively, and being shiftable to close the outlet and either inlet when motive fluid is supplied to the master valve through the other inlet only, a supply line having branches to the inlets respectively, and individually operable manual valves in said branches, the manual valves being of the combined intake and exhaust type and normally arranged with their intakes closed and the exhaust open, conduits connecting the branches between the manual valves and the inlets of the master valve, and the outlet of the master valve, said conduits having check valves therein operable to exhaust the outlet of the master valve when either of the manual valves is in its normal position.

3. A two hand control including a master valve having a movable valve member, opposing inlets for motive fluid, and an outlet, the valve member having means for closing the inlets respectively, said valve member being normally arranged so that the inlets and outlet are open, and shiftable to close the outlet and either inlet when fluid is supplied to the other inlet only, a supply line having branches to the inlets respectively, and individually operable manual valves in said branches, the manual valves being of the combined intake and exhaust type and normally arranged so that their intakes are closed and the exhaust open, and conduits connecting the branches between the manual valves and the master valve, and the outlet of the master valve, the conduits having check valves therein operable to exhaust the outlet when either of the manual valves is in its normal position, the master valve having release outlets closed by its movable valve member when the same is in normal position, and opened by the movement of the valve member out of normal position to exhaust air from the control valve when the control valve member is out of its normal position.

4. A two hand control including a master valve having a casing provided with a pair of inlets for a pressure fluid, an outlet to a part to be served with a pressure fluid, a movable valve member normally located so that both the inlets and the outlet are open, self-returning manually operated control valves of the combined intake and exhaust type connected to the inlets respectively, and each including a movable member normally arranged to close the manual valve to the inlet of motive fluid and to exhaust the motive fluid therefrom, the movable member of the master valve being operable to close either inlet and the outlet by the pressure of the fluid entering the master valve through said other inlet, when the manual valve only controlling the other inlet is operated out of normal position, and being held from shifting movement when both manual valves are operated in unison and the pressure on opposite sides of the movable member of the master valve is equal.

5. A two hand control including a master valve having a casing provided with a pair of inlets for a pressure fluid, an outlet to a part to be served with a pressure fluid, a movable valve member normally located so that both the inlets and the outlet are open, self-returning manually operated control valves of the combined intake and exhaust type connected to the inlets respectively, and each including a movable member normally arranged to close the manual valve to the inlet of motive fluid and to exhaust the motive fluid therefrom, the movable member of the master valve being operable to close either inlet and the outlet by the pressure of the fluid entering the master valve through said other inlet, when the manual valve only controlling the other inlet is operated out of normal position, and being held from shifting movement when both manual valves are operated in unison and the pressure on opposite sides of the movable member of the master valve is equal, and exhaust outlets in communication with the outlet of the master valve and controlled by the manual valves respectively and also held from opening movement by the pressure of the fluid passing through the manual valves respectively when the latter are operated from their normal position to permit the flow of fluid to the master valve, said exhaust valves being operable to open position by the higher pressure in the outlet of the master valve when either of the manual valves returns to its normal position after both manual valves have been operated in unison.

BASIL J. YANCHENKO.